US011206656B2

(12) United States Patent
Li et al.

(10) Patent No.: US 11,206,656 B2
(45) Date of Patent: Dec. 21, 2021

(54) SYSTEMS AND METHODS FOR IDENTIFICATION AND SELECTION OF DOWNLINK CONTROL INFORMATION (DCI) CANDIDATES

(71) Applicant: VIAVI Solutions Inc., San Jose, CA (US)

(72) Inventors: Wei Li, Stevenage (GB); Li-Ke Huang, St Albans (GB); Kexuan Sun, Stevenage (GB); Hua Luo, Luton (GB)

(73) Assignee: VIAVI Solutions Inc., San Jose, CA (US)

( * ) Notice: Subject to any disclaimer, the term of this patent is extended or adjusted under 35 U.S.C. 154(b) by 149 days.

(21) Appl. No.: 16/735,200

(22) Filed: Jan. 6, 2020

(65) Prior Publication Data

US 2021/0212031 A1 Jul. 8, 2021

(51) Int. Cl.
*H04W 72/04* (2009.01)

(52) U.S. Cl.
CPC ................. *H04W 72/042* (2013.01)

(58) Field of Classification Search
CPC ..... H04W 76/28; H04W 72/04; H04W 76/27; H04W 72/1289; H04W 72/0466; H04W 72/042; H04W 72/14; H04W 72/0406
See application file for complete search history.

(56) References Cited

U.S. PATENT DOCUMENTS

| 2013/0230017 A1* | 9/2013 | Papasakellariou ........................... H04W 72/0406 370/330 |
| 2014/0369293 A1* | 12/2014 | Guo .................... H04W 72/082 370/329 |
| 2015/0382371 A1* | 12/2015 | Liu ................... H04W 72/1231 370/329 |

(Continued)

FOREIGN PATENT DOCUMENTS

| EP | 3661261 A1 | 6/2020 |
| WO | 2018019938 A1 | 2/2018 |

OTHER PUBLICATIONS

Ericsson., "Clarification on DCI Formats Monitoring", 3GPP Draft; R1-1910899 Clarification on DCI Formats Monitoring, 3rd Generation Partnership Project (3GPP), Oct. 5, 2019, vol. RAN WG1. (No. Chongqing). 6 pages, XP051808735, [retrieved on Oct. 5, 2019] Retrieved from the internet [URL:https://www.3gpp.org/ftp/tsg_ran/WG1_RL1/TSGR1_98b/Docs], Document Name: R1-1910899. zip.

(Continued)

*Primary Examiner* — Chi Ho A Lee
(74) *Attorney, Agent, or Firm* — Harrity & Harrity, LLP

(57) ABSTRACT

A device determines a scrambling sequence for a control channel, wherein the scrambling sequence includes a first set of bit string values for a set of downlink control information (DCI) candidates associated with the control channel, and wherein the scrambling sequence is determined based on an (Continued)

identifier that is exclusive to the device. The device determines, based on the scrambling sequence, a correlation sequence that includes a second set of bit string values. The device identifies, based on the correlation sequence, a subset of DCI candidates of the set of DCI candidates. The device selects at least a portion of the subset of DCI candidates. The device performs one or more actions based on one or more selected DCI candidates.

20 Claims, 9 Drawing Sheets

(56) References Cited

U.S. PATENT DOCUMENTS

| | | | | |
|---|---|---|---|---|
| 2017/0202043 | A1* | 7/2017 | Seo | H04W 76/14 |
| 2018/0249446 | A1* | 8/2018 | You | H04W 72/042 |
| 2018/0317198 | A1* | 11/2018 | Lee | H04W 68/005 |
| 2019/0150155 | A1* | 5/2019 | Chatterjee | H04W 72/0466 |
| | | | | 370/335 |
| 2019/0313428 | A1* | 10/2019 | Zhou | H04W 48/12 |
| 2019/0342907 | A1* | 11/2019 | Huang | H04W 72/1289 |
| 2020/0146016 | A1* | 5/2020 | Manolakos | H04W 76/27 |
| 2020/0154295 | A1* | 5/2020 | Lin | H04W 76/28 |
| 2021/0076385 | A1* | 3/2021 | Claeson | H04W 76/11 |

OTHER PUBLICATIONS

Extended European Search Report for Application No. EP21150120.0, dated May 31, 2021, 10 pages.

Mediatek Inc., "DCI Contents in NR", 3GPP Draft; R1-1707824 DCI Contents in NR_FINAL (3GPP), May 14, 2017, vol. RAN WG1 (No. Hangzhou), 4 pages, XP051273025, [retrieved on May 14, 2017] Retrieved from the internet [URL: http://www.3gpp.org/ftp/Meetings_3GPP_SYNC/RAN1/Docs/].

Nokia et al., "On Two-stage DCI for NR", 3GPP Draft; R1-1703314 on Two-stage for NR (3GPP), Feb. 12, 2017, vol. RAN WG1 (No. Athens), 4 pages, XP051210444, [retrieved on Feb. 12, 2017] Retrieved from the Internet [URL: http://www.3gpp.org/ftp/Meetings_3GPP_SYNC/RAN1/Docs].

* cited by examiner

SYSTEMS AND METHODS FOR IDENTIFICATION AND SELECTION OF DOWNLINK CONTROL INFORMATION (DCI) CANDIDATES

BACKGROUND

In a network, a base station may transmit a physical downlink control channel (PDCCH) (e.g., including control information, such as downlink control information (DCI)) based on a search space set. A given search space set defines candidates (e.g., DCI candidates) that may carry a PDCCH within the search space set, where each candidate is associated with one or more control channel elements (CCEs). A CCE may be composed of multiple resource element groups (REGs). A REG may include one resource block and one orthogonal frequency-division multiplexing (OFDM) symbol. One or more search space sets may be associated with a control resource set (CORESET). In a New Radio (NR) network, a base station may flexibly schedule and transmit the PDCCH. In other words, transmission of the PDCCH in the NR network is not limited to a particular set of frequency resources and/or time resources in a given radio frame, as in the case of, for example, a long term evolution (LTE) network.

SUMMARY

According to some implementations, a method, by a device, may include determining a scrambling sequence for a control channel, wherein the scrambling sequence includes a first set of bit string values for a set of downlink control information (DCI) candidates associated with the control channel, and wherein the scrambling sequence is determined based on an identifier that is exclusive to the device or a group of devices. The method may include determining, based on the scrambling sequence, a correlation sequence that includes a second set of bit string values. The method may include identifying, based on the correlation sequence, a subset of DCI candidates of the set of DCI candidates. The method may include selecting at least a portion of the subset of DCI candidates. The method may include performing one or more actions based on one or more selected DCI candidates.

According to some implementations, a device may include one or more memories, and one or more processors, communicatively coupled to the one or more memories, configured to determine a scrambling sequence for a control channel, wherein the scrambling sequence includes a first set of integer values for a set of DCI candidates associated with the control channel, and wherein the scrambling sequence is determined based on an identifier that is linked to the device. The one or more processors may determine, based on the scrambling sequence, a correlation sequence that includes a second set of integer values. The one or more processors may identify, based on the correlation sequence, a subset of DCI candidates of the set of DCI candidates. The one or more processors may select at least a portion of the subset of DCI candidates. The one or more processors may transmit or receive the control channel in one or more selected DCI candidates.

According to some implementations, a non-transitory computer-readable medium may store one or more instructions. The one or more instructions, when executed by one or more processors of a device, may cause the one or more processors to receive DCI candidate data that is to be used for a control channel, that associates respective DCI candidates, of a set of DCI candidates, with corresponding configured bit string values. The one or more instructions may cause the one or more processors to determine a scrambling sequence for the control channel, wherein the scrambling sequence includes a first set of bit string values for the set of DCI candidates associated with the control channel, and wherein the scrambling sequence is determined based on an identifier that is exclusive to the device or a group of devices. The one or more instructions may cause the one or more processors to determine, based on the scrambling sequence, a correlation sequence that includes a second set of bit string values. The one or more instructions may cause the one or more processors to identify, based on the correlation sequence, a subset of DCI candidates of the set of DCI candidates. The one or more instructions may cause the one or more processors to select at least a portion of the subset of DCI candidates. The one or more instructions may cause the one or more processors to perform one or more actions based on one or more selected DCI candidates. The one or more actions may include at least one of: a first action to transmit the control channel, a second action to cause the control channel to be received, or a third action to decode the control channel.

DETAILED DESCRIPTION

Figure 1A:
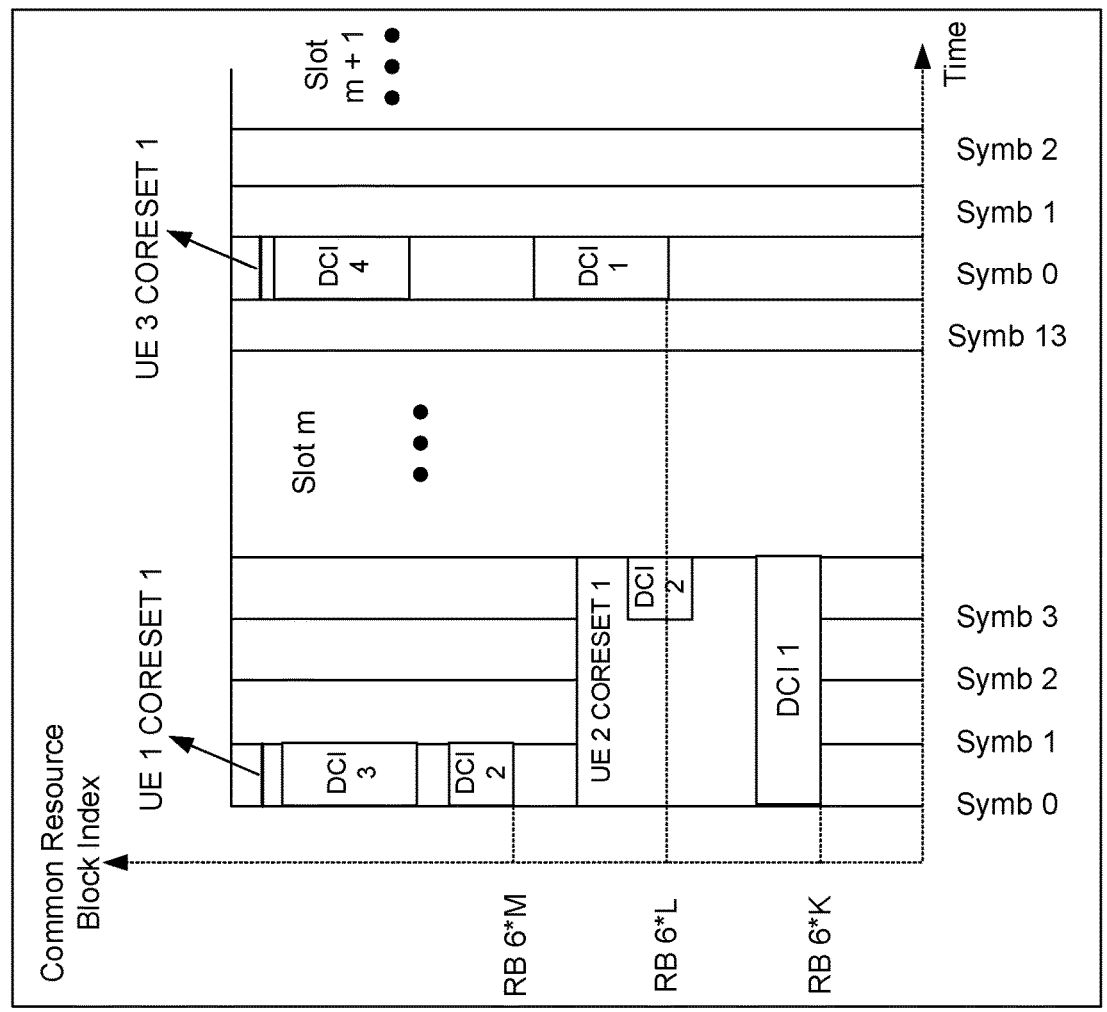
FIGS. 1A-1D are diagrams of one or more example implementations described herein.
Figure 1A:
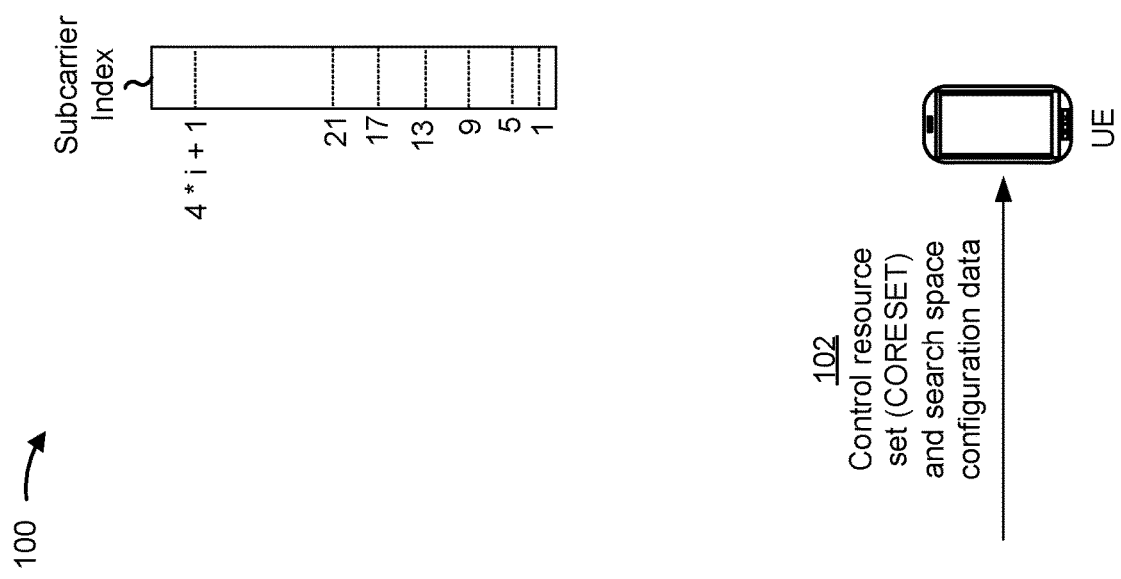

The following detailed description of example implementations refers to the accompanying drawings. The same reference numbers in different drawings may identify the same or similar elements.

Frequency domain and time domain resources for a physical downlink control channel (PDCCH) are configured on a per control resource set (CORESET) basis. Thus, once a user equipment (UE) is configured with a CORESET, the UE has information that identifies which resource blocks in the frequency domain are assigned to a search space set associated with the CORESET, as well as information that identifies a number of consecutive symbols occupied by the search space set. A PDCCH location in the time domain may be configured on a per search space set basis. Here, for a given search space set associated with a CORESET, the UE is configured with information that identifies a monitoring periodicity associated with the search space set (e.g., information indicating that the search space set should be monitored once every X (X≥1) slots), information that identifies a monitoring offset (e.g., information that identifies a particular slot, of each X slots, that the UE is to monitor), information that identifies a monitoring pattern (e.g., information that identifies a first symbol of the search space set within the particular slot), and/or the like. Thus, the UE may be configured with information that allows the UE to identify resources of the search space set in both the frequency domain and the time domain, and the base station may transmit a PDCCH in one or more DCI candidates in the search space set.

The locations of the DCI candidates across a search space set may be varied when transmitted by the base station (e.g., in order to avoid PDCCH collisions among neighboring cells, in order to avoid patterned PDCCH transmissions, and/or the like). Thus, the UE needs to identify a location of a selected DCI candidate before attempting to decode the PDCCH.

To identify a location of a selected DCI candidate, the UE performs a DCI detection procedure for each respective DCI candidate. For example, the UE determines physical resource blocks (PRBs) associated with corresponding DCI candidates, performs channel estimation for PDCCH data on the PRBs using a demodulation reference signal (DMRS), performs de-mapping of equalized data, de-scrambles log-likelihood ratio (LLR) data, decodes and conducts cyclic redundancy check (CRC), and determines the locations of the DCI candidates based on the de-scrambling of the CRC data.

In some situations, such as when the UE is connected to a New Radio (NR) network, the search space set that the UE is configured with may include multiple search spaces (e.g., which may be located on different frequency-time resource blocks with different symbol durations). In these situations, the UE expends considerable resources (e.g., processing resources, memory resources, and/or the like) to monitor DCI candidates in the search space set (e.g., the UE can monitor up to 36 non-overlapping DCI candidates in a given search space), expends considerable resources performing the DCI detection procedure for each respective DCI candidate, and/or the like.

Some implementations described herein provide for a device (e.g., a UE, a base station, and/or the like) to identify and select a subset of DCI candidates that are part of a set of available DCI candidates of a control channel. For example, the device may identify and select a subset of DCI candidates, such that the control channel may be transmitted or received in selected DCI candidates, may be properly decoded (e.g., based on locations of selected DCI candidates in a search space set), and/or the like. In this case, the device may determine a scrambling sequence (e.g., a DMRS sequence, a UE-specific scrambling sequence, and/or the like) for the control channel and may determine a correlation sequence (e.g., a cross-correlation sequence, an auto correlation sequence, and/or the like) based on the scrambling sequence. Additionally, the device may compare the correlation sequence with a configured correlation sequence and may identify and select a subset of DCI candidates based on the comparison. This may allow the control channel to be received in the selected DCI candidates, to be properly decoded (e.g., based on locations of the selected DCI candidates in a frequency domain and/or a time domain), and/or the like.

In this way, the device efficiently and/or effectively identifies and selects the subset of the set of DCI candidates. Additionally, in some cases, the device identifies and selects the subset of DCI candidates prior to performing channel estimation. Consequently, the device only has to perform channel estimation on selected DCI candidates (rather than each DCI candidate in the set), thereby reducing a utilization of resources (e.g., processing resources, memory resources, and/or the like) relative to performing channel estimation on each respective DCI in the set. Furthermore, if the correlation sequence is an auto correlation sequence, the device identifies and selects DCI candidates based on comparing sign bits of the auto correlation sequence with corresponding configured sign bits of a configured auto correlation sequence. This reduces a utilization of resources relative to comparing a full set of values of a DMRS sequence with a corresponding configured DMRS sequence.

FIGS. 1A-1D are diagrams of one or more example implementations 100 described herein. Example implementation(s) 100 may include a user equipment (UE) and a base station.

As shown in FIGS. 1A-1D, the UE may identify and select downlink control information (DCI) candidates, that are part of a set of DCI candidates of a control channel, such that the control channel may be received in selected DCI candidates, such that the UE may properly decode the control channel, and/or the like.

The set of DCI candidates may be defined by a search space set that includes one or more search spaces. The search space set may be associated with a control resource set (CORESET). Each respective DCI candidate may be associated with one or more control channel elements (CCEs) of the control channel. The control channel may have a payload that includes DCI bits that are mapped to the CCEs. A CCE may include multiple resource element groups (REGs). A REG may include one resource block (RB) and one OFDM symbol.

In some implementations, the control channel may be a physical downlink control channel (PDCCH) and/or a similar type of channel. In some implementations, the control channel may be a UE-specific control channel. In some implementations, the control channel may be a common control channel (e.g., shared between multiple UEs).

While one or more implementations described herein refer to a single UE, it is to be understood that this is provided by way of example, and that in practice, one or more implementations described herein may be performed by a group of UEs that are connected to the base station and/or to one or more other base stations.

As shown in FIG. 1A, and by reference number 102, the UE may receive CORESET and search space configuration data. For example, frequency domain and time domain resources may be configured on a per CORESET and search space basis and the UE may receive CORESET and search space configuration data that allows the UE to be configured with a CORESET that is associated with the search space set. The CORESET and search space may identify and/or define frequency domain resources and time domain resources that may be used to send and/or receive data over a network (e.g., an NR network, a long term evolution (LTE) network, and/or the like). The CORESET and search space configuration data may include CORESET domain data that defines resources of the frequency domain and time domain, DCI candidate data for the set of DCI candidates, reference signal configuration data, and/or the like.

The CORESET domain data may include a CORESET identifier, data that identifies which resource blocks in the frequency domain are assigned to respective search spaces of the search space set, data that identifies a quantity of consecutive symbols occupied by the search space set, data that identifies a first symbol for respective DCI candidates and/or symbol durations for the respective DCI candidates, mapping data that identifies a PDCCH data mapping type, and/or the like. The DCI candidate data may include data that identifies a quantity of DCI candidates that the UE is to monitor, aggregation level data that identifies an aggregation level for respective DCI candidates, monitoring data that identifies a duration during which to monitor respective DCI candidates (e.g., data indicating that the search space set should be monitored once every X (X≥1) slots) and/or that identifies respective slots that the UE is to monitor, and/or the like. The quantity of DCI candidates that may be monitored may be 64 DCI candidates, 128 DCI candidates, 4096 DCI candidates, 8192 DCI candidates, 32,768 DCI candidates, and/or the like.

The reference signal configuration data may include a set of configured values that map to physical resources of the search space set and that correspond to the set of DCI candidates. The set of configured values may be part of a configured scrambling sequence, a configured correlation sequence (e.g., a configured cross-correlation sequence, a configured auto correlation sequence, a configured sequence of sign bits that are part of the configured auto correlation sequence, and/or the like), and/or the like. The set of configured values may include a set of configured bit strings, a set of configured integer values (e.g., 64-bit integer values, where respective bits are a zero or a one), a set of configured pairs of integer values that include a real number and an imaginary number associated with a sign of the real number (as described further herein), and/or the like.

In some implementations, the set of configured values may include subsets of configured values corresponding to ranges of network performance indicator values. For example, the set of values may include a first subset of configured values that corresponds to a range of high signal-to-noise (SNR) values (e.g., relative to a baseline SNR value, an average SNR, and/or the like), a second subset of configured values that corresponds to a range of low SNR values (e.g., relative to a baseline SNR value, an average SNR, and/or the like), and/or the like.

In some implementations, the UE may receive the CORESET configuration data from the base station. Additionally, or alternatively, the UE may receive the CORESET configuration data from one or more other devices associated with a core network, a server device associated with a data center, and/or the like. In some implementations, the UE may receive the CORESET configuration data based on a trigger. For example, the UE may receive the CORESET configuration data based on user input (e.g., an administrator of a service provider may interact with a user device to cause the CORESET configuration data to be provided to the UE), based on the UE being within a coverage area of the base station, based on the UE attempting to connect to the core network (e.g., via an attachment procedure), and/or based on another type of trigger.

In some implementations, the UE may generate the reference signal configuration data. For example, the UE may generate the reference signal configuration data such that respective values within the set of configured values correspond to each symbol-slot pairing in the search space set. In this case, the UE may generate the reference signal configuration data by performing a Fast Fourier Transform (FFT) technique to process FFT data and/or other types of CORESET configuration data.

In some implementations, the UE may store the CORESET configuration data using a data structure. For example, the UE may store the CORESET configuration data such that one or more types of CORESET configuration data are stored in association with each other. As a specific example, the UE may store the DCI candidate data in association with the CORESET data, the reference signal configuration data, and/or the like.

The example shown in FIG. 1A illustrates the set of DCI candidates as being allocated on a set of resource blocks (e.g., physical resource blocks (PRBs)). In this example, the UE may be a first UE (shown as UE 1), and the first UE and one or more other UEs (e.g., a second and third UE, respectively shown as UE 2 and UE 3) may each be configured to monitor the set of DCI candidates. The first UE may be configured to monitor two DCI candidates (shown as DCI 2 and DCI 3), where DCI 2 has an aggregation level of one, DCI 3 has an aggregation level of two, and where DCI 2 and DCI 3 are scheduled on CORESET 1 on symbol zero of slot m. The second UE may be configured to monitor two DCI candidates (shown as DCI 1 and DCI 2), where DCI 1 and DCI 2 have an aggregation level of one, where DCI 1 is scheduled on CORESET 1 on symbol zero, symbol one, symbol two, and symbol three of slot m, and where DCI 2 is scheduled on CORESET 1 on symbol three of slot m. The third UE may be configured to monitor two DCI candidates (shown as DCI 1 and DCI 4), where DCI 1 and DCI 4 have an aggregation level of one, and where DCI 1 and DCI 4 are scheduled on CORESET 1 on symbol zero of slot m+1.

In this way, the UE receives CORESET configuration data that is to be used to identify and select a subset of the set of DCI candidates.

Figure 1B:
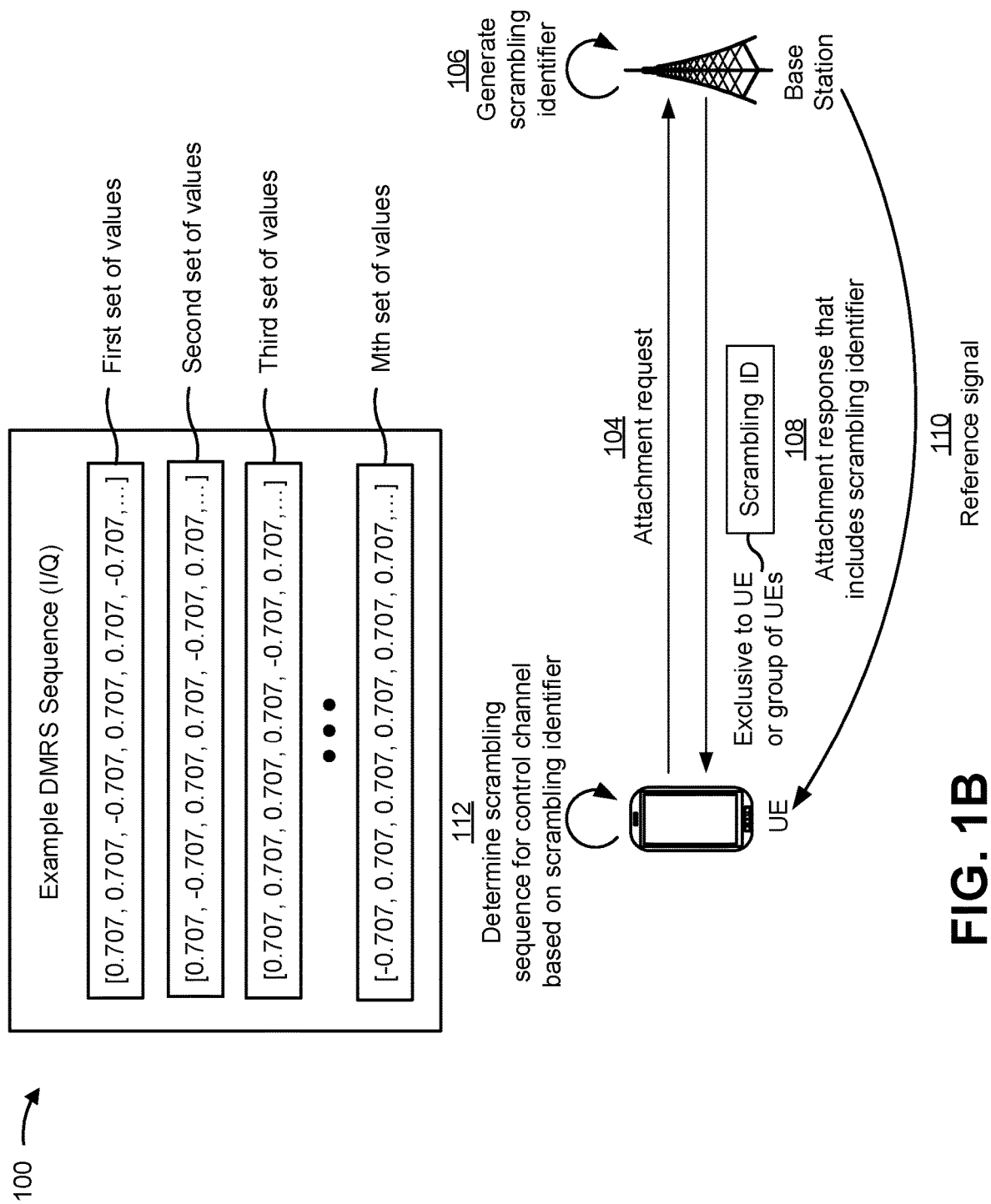

As shown in FIG. 1B, the UE may receive a scrambling identifier that is to be used as part of a blind control channel detection procedure that is capable of identifying a subset of DCI candidates that are to be selected. For example, and as shown by reference number 104, the UE may connect to a core network by providing an attachment request to the base station. The core network may include a fifth generation (5G) network (e.g., an NR network), a fourth generation (4G) network (e.g., an LTE network), and/or the like.

As shown by reference number 106, the base station may generate the scrambling identifier. For example, the base station may be configured to generate the scrambling identifier based on receiving the attachment request and/or based on another type of trigger. The scrambling identifier may, for example, be a DMRS scrambling identifier and/or another type of identifier.

In some implementations, the base station may generate the scrambling identifier such that the scrambling identifier has a value that is exclusive to the UE (e.g., such that no other connected UEs have the same scrambling identifier) or to a group of UEs. For example, the base station may generate the scrambling identifier using a random value generator, a hash function that generates the scrambling identifier based on an identifier of the UE (and/or a cell radio network temporary identifier (C-RNTI)), and/or the like. As a specific example, the scrambling identifier may be a random number generated between 0 and 65535. Additionally, the base station may have access to a data structure that identifies a set of scrambling identifiers being used by other UEs that are connected to the core network, and may reference the data structure to verify that the scrambling identifier generated for the UEs is not being used by any other UEs that are connected to the core network.

As shown by reference number 108, the base station may provide, to the UE, an attachment response that includes the scrambling identifier. For example, the base station may provide the UE with the attachment response that includes the scrambling identifier that is exclusive to the UE.

Additionally, or alternatively, the UEs may generate the scrambling identifier. For example, the UEs may receive, from the base station, a C-RNTI and/or another type of RNTI. The C-RNTI may be received as part of the attachment response or as a separate message transmission. In this case, the UEs may generate the scrambling identifier based on the C-RNTI. For example, the UEs may provide the C-RNTI as input to a random value generator, a hash function, and/or the like, to cause the random value generator, the hash function, and/or the like, to output the scrambling identifier.

As shown by reference number 110, the UEs may receive one or more reference signals from the base station. For example, the UEs may receive one or more reference signals (e.g., one or more DMRSs) via DCI candidates of the search space set.

As shown by reference number 112, the UE may determine a scrambling sequence for the control channel. For example, the UE may determine a scrambling sequence based on the scrambling identifier and/or the received reference signal (e.g., the DMRS). In this case, the UE may use a sequence generator, such as a DMRS sequence generator, a pseudorandom binary sequence (PRBS) generator, and/or the like, to determine a scrambling sequence, such as a DMRS sequence. In this case, the UE may initialize the sequence generator using the scrambling identifier, a cell radio network temporary identifier (C-RNTI) (and/or another type of RNTI), and/or the like. Initialization values selected for the sequence generator may, for example, be based on whether the control channel is to be transmitted in a common search space, a UE-specific search space, and/or the like.

In some implementations, the scrambling sequence may include one or more sets of values (e.g., float pointed values, integer values, binary values, logical values, and/or the like), where respective sets of values correspond to respective DCI candidates of the set of DCI candidates. In the example shown, the scrambling sequence may include a first set of values (shown as 0.707, 0.707, −0.707, 0.707, 0.707, −0.707, . . . ), a second set of values (shown as 0.707, —0.707, 0.707, 0.707, −0.707, 0.707, . . . ), a third set of values (shown as 0.707, 0.707, 0.707, 0.707, −0.707, 0.707, . . . ), , and an Mth set of values (shown as −0.707, 0.707, 0.707, 0.707, 0.707, 0.707, . . . ). In this example, M corresponds to a total quantity of DCI candidates in the set of DCI candidates.

In some implementations, the UE may determine the scrambling sequence based on a binary phase shift keying (BPSK) (1-bit) modulation scheme, based on a quadrature phase shift keying (QPSK) (2-bit) modulation scheme, and/or the like. As an example, if there are 64 DCI candidates, and the UE determines a scrambling sequence that includes sets of values that have been modeled based on a QPSK modulation scheme, the scrambling sequence may include 64 sets of values, whereby each respective set of values includes a 2-bit string of 00, 01, 10, or 11.

In some implementations, the UE may generate sets of integer values such that respective sets of integer values correspond to respective DCI candidates of the set of DCI candidates. For example, if the set of DCI candidates includes 64 DCI candidates, the UE may generate 64 sets of integer values, where each set of integer values correspond to physical resources of the search space set that have been assigned to a particular DCI candidate (e.g., as indicated by the CORESET configuration data). In some implementations, the UE may generate a set of integer values for each symbol in respective slots of the search space set.

In some implementations, the UE may generate sets of values of a DMRS sequence such that respective sets of values map to particular subcarriers of RBs within the search space set. For example, the UE may generate sets of values that correspond to particular subcarrier index values that are part of a subcarrier index. As a specific example, the sets of values may map to a first, fifth, and ninth subcarrier of an RB (e.g., an RB may include a set of twelve subcarriers), as specified by the following equation:

$$a_{k,l}^{(p,\mu)} = \beta_{DMRS}^{PDCCH} * r_l(3n+k') \qquad \text{Equation 1}$$

where $k = nN_{sc}^{RB} + 4k' + 1$
where $k' = 0, 1, 2$
where $n = 0, 1, \ldots$.

In the equation above, $a_{k,l}^{(p,\mu)}$ represents a value of resource element (k, l) (where k is a frequency domain index and l is a time domain index), for antenna port p, and subcarrier spacing configuration $\mu$. In this example, $r_l$ may be the DMRS sequence and k may be the subcarrier index that has a reference point on subcarrier zero or a lowest-numbered RB in the CORESET. Consequently, subcarriers that may carry a PDCCH DMRS have an index of $k = 4*i+1$, where $i = 0, 1, 2, 3$ . . . . Furthermore, $\beta_{DMRS}^{PDCCH}$ may be an amplitude scaling factor for the control channel (e.g., for a reference signal of the control channel, such as the DMRS). In this way, the equation above may be used to generate the scrambling sequence such that respective sets of values of the DMRS sequence map to resource elements (e.g., particular subcarriers of RBs) within the search space set.

In some implementations, the base station may determine the scrambling sequence. For example, the base station may determine the scrambling sequence in a manner described above and may provide the UE with the scrambling sequence.

In this way, the UE determines the scrambling sequence for the control channel based on the scrambling identifier that is exclusive to the UE.

Figure 1C:
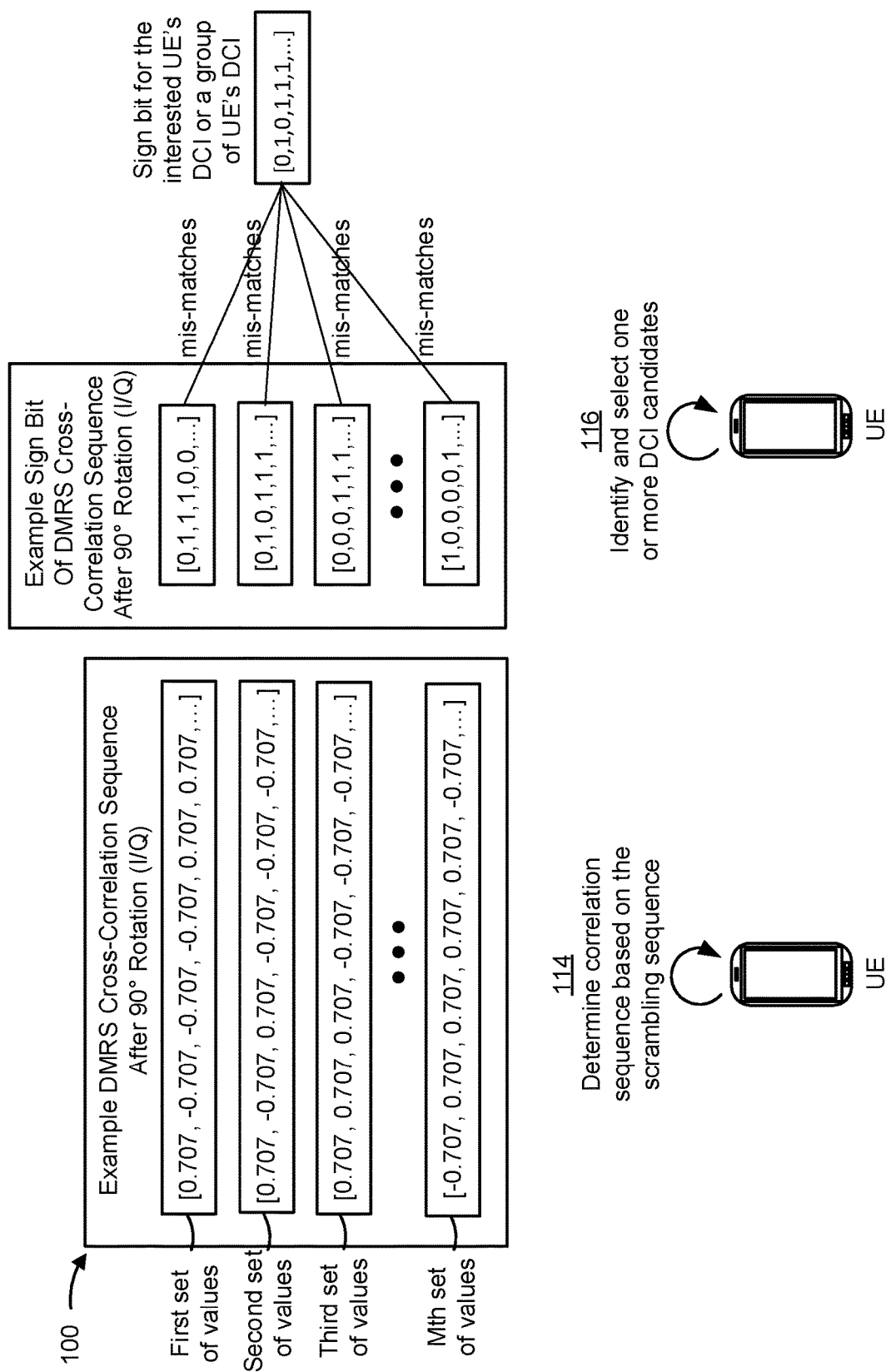

As shown in FIG. 1C, and by reference number 114, the UE may determine a correlation sequence based on the scrambling sequence. For example, the UE may process the scrambling sequence to determine a correlation sequence, such as a cross-correlation sequence, an auto correlation sequence, and/or the like, as described below.

In some implementations, the UE may determine the cross-correlation sequence. For example, the UE may determine the cross-correlation sequence by determining cross-correlations between adjacent sets of values, of the sets of values included in the scrambling sequence. The sets of values may correspond to particular physical resources in the search space set (e.g., a set of values may correspond to a symbol-slot pair, where each slot may include one or more symbols). The cross-correlation sequence may include sets of values (e.g., that are of the same data type described in connection with the scrambling sequence). In the example shown, the UE may determine a cross-correlation sequence that includes a first set of values (shown as 0.707, −0.707, −0.707, −0.707, 0.707, 0.707, . . . ), a second set of values (shown as 0.707, −0.707, 0.707, −0.707, −0.707, −0.707, . . . ), a third set of values (shown as 0.707, 0.707, 0.707, −0.707, −0.707, −0.707, . . . ), , and an Mth set of values (shown as −0.707, 0.707, 0.707, 0.707, 0.707, −0.707, . . . ). By determining the cross-correlation sequence, the UE conserves resources (e.g., processing resources, memory resources, and/or the like) that would otherwise be expended performing computations relating to channel rotation.

In some implementations, the UE may determine the auto correlation sequence. For example, the UE may determine the auto correlation sequence such that an impact of channel phase rotation may be eliminated before channel estimation. In this case, the UE may determine the auto correlation sequence by comparing adjacent sets of values, of the sets of values included in the scrambling sequence.

To provide a specific example, the UE may determine the auto correlation sequence using the following equation:

$$(2) \overline{y_k} = |h_k|^2 \overline{x_k} + \overline{w_k} \quad \text{Equation 2}$$

In Equation 2, $\overline{y_k}$ approximates the auto correlation of two received adjacent sets of values ($y_k$ and $y_{k+1}$), wherein $\overline{x_k}$ approximates the auto correlation of two transmitted adjacent sets of values ($x_k$ and $x_{k+1}$), and $\overline{w_k}$ is the noise term with a normal product distribution. In Equation 2, the phase rotation caused by a channel is eliminated and the auto correlation is a scaled version of the auto correlation transmitted DMRS sequence.

In some implementations, the UE may determine the auto correlation sequence using a fast detection technique. As shown in FIG. 1C, an auto-correlation sequence may reduce complexity by using sign bits of 1 and 0. For example, −0.707 may have a sign bit of 1, and +0.707 may have a sign bit of 0. FIG. 1C shows a resulting sign bit for interested UE's DCI or group of UE's DCI.

As shown by reference number 116, the UE may identify and select a subset of the set of DCI candidates. For example, the UE may identify and select a subset of DCI candidates, of the set of DCI candidates, based on the correlation sequence. In this case, certain values of the correlation sequence may have been skewed by noise (and therefore may no longer match with corresponding configured values that are part of the configured correlation sequence). Consequently, if values of the correlation sequence match or satisfy a threshold level of similarity with corresponding configured values of the configured correlation sequence, the UE may select a DCI candidate that maps to the corresponding configured values. Similarly, if the values of the correlation sequence do not match or satisfy the threshold level of similarity with the corresponding configured values, the UE may determine not to select the DCI candidate that maps to the corresponding configured values.

As an example, the UE may identify the subset of DCI candidates based on comparing values of the cross-correlation sequence of a received signal with corresponding configured values of the configured cross-correlation sequence. In this example, the UE may compare the values of the cross-correlation sequence with the corresponding configured values of the configured cross-correlation sequence, and may, based on the comparison, identify particular values of the cross-correlation sequence that match with or satisfy a threshold level of similarity with corresponding configured values of the configured cross-correlation sequence. In this case, the UE may select the subset of DCI candidates that correspond to the particular values of the cross-correlation sequence based on the particular values matching or satisfying the threshold level of similarity with the corresponding values of the configured cross-correlation sequence.

As another example, the UE may identify the subset of DCI candidates based on comparing values of the auto correlation sequence of a received signal with corresponding configured values of the configured auto correlation sequence. In this example, the UE may compare the values of the auto correlation sequence with the corresponding configured values of the configured auto correlation sequence, and may, based on the comparison, identify particular values of the auto correlation sequence that match with or satisfy a threshold level of similarity with corresponding configured values of the configured auto correlation sequence. In this case, the UE may select the subset of DCI candidates that correspond to the particular values of the auto correlation sequence based on the particular values matching or satisfying the threshold level of similarity with the corresponding values of the configured auto correlation sequence. In this way, the UE reduces a utilization of resources (e.g., processing resources, memory resources, and/or the like) needed to identify and select DCI candidates (e.g., relative to performing a channel estimation technique on each respective DCI candidate, relative to comparing values of the cross-correlation sequence with corresponding configured values of the configured cross-correlation sequence, and/or the like).

In some implementations, the UE may identify and select one or more DCI candidates, of the subset of DCI candidates, by performing a channel estimation technique. For example, in rare situations, multiple UEs that are connected to the network via the base station may determine the same auto correlation sequence (e.g., despite that the scrambling sequences used to determine each respective auto correlation sequence were based on unique scrambling identifiers). In these cases, the UE may receive an indication that the auto correlation sequence of the UE matches the auto correlation sequence of at least one other UE that is connected to the core network via the base station. Additionally, the UE may, based on receiving the indication, perform a channel estimation technique to determine a correlation coefficient of the control channel estimate on respective sub carriers of the search space set. This may allow the UE to identify and select the one or more DCI candidates based on whether the correlation coefficient satisfies a threshold correlation coefficient value.

By identifying the subset of DCI candidates prior to performing the channel estimation technique, the UE conserves resources relative to having to perform the channel estimation technique on each DCI candidate in the set.

In this way, the UE identifies and selects DCI candidates based on the correlation sequence.

Figure 1D:
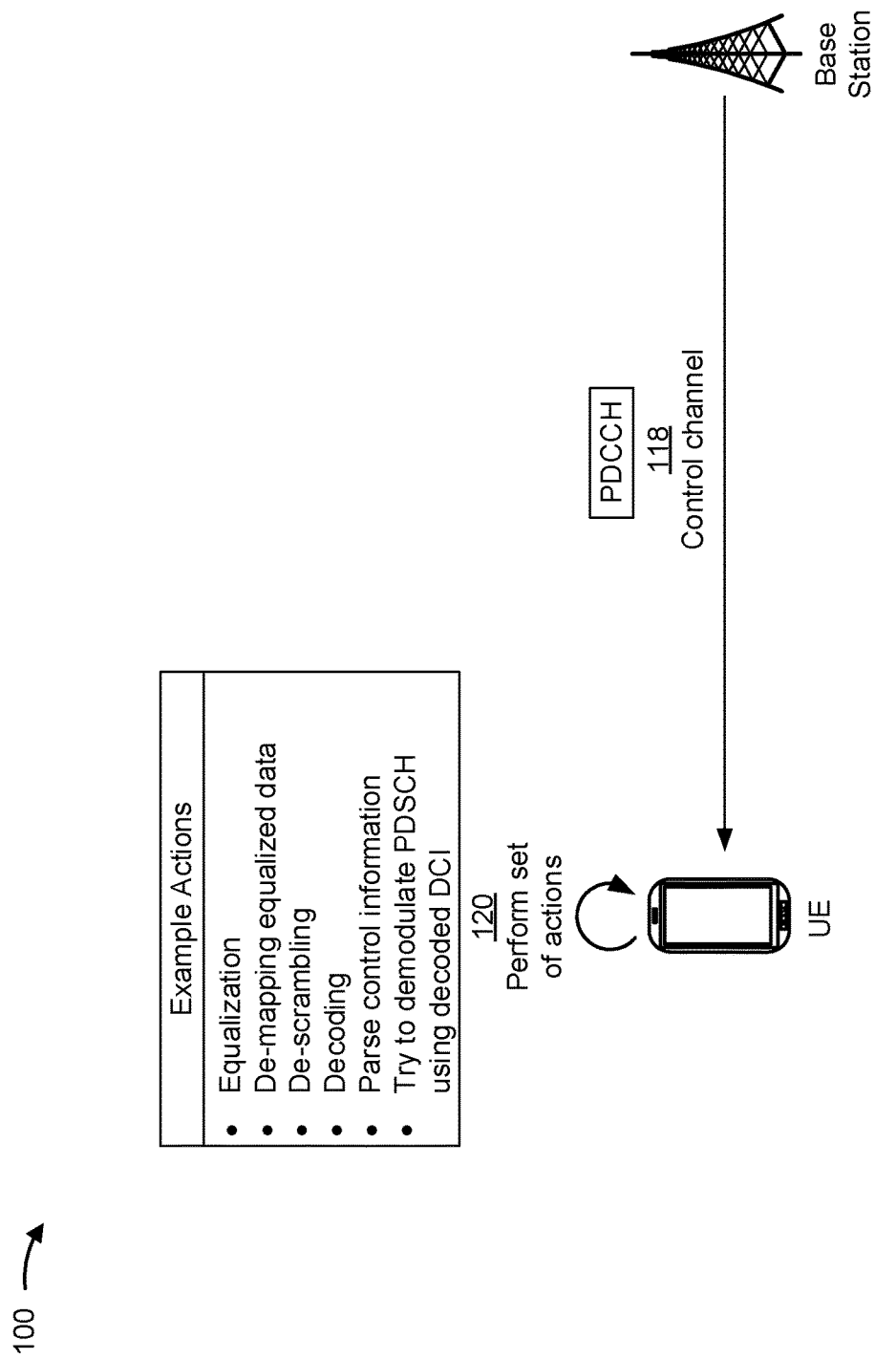

As shown in FIG. 1D, and by reference number 118, the base station may provide the UE with the control channel. For example, the base station may provide the UE with the control channel (e.g., the PDCCH) in the selected DCI candidates. The control channel may include control information, such as information needed to receive and demodulate user-specific information transmitted through another signal (e.g., a physical downlink shared channel (PDSCH)), a DCI message, and/or the like. The control channel may be transmitted in the control channel region occupying a few OFDM symbols at the beginning of each UE-specific subframe.

As shown by reference number 120, the UE may perform a set of actions. For example, the UE may perform a set of actions to allow the control channel to be properly decoded, that try to demodulate PDSCH using decoded DCI, and/or the like. The set of actions may include equalizing the control channel (e.g., to reverse any distortion incurred while receiving reference signals), de-mapping of equalized data, de-scrambling of log-likelihoods ratio (LLR) data, de-ratematching and decoding the control channel, parsing the decoded control information, and/or the like.

In some implementations, the UE may equalize the control channel to reverse any distortion incurred when reference signals (e.g., the DMRS) were transmitted from the base station. Additionally, or alternatively, the UE may use a de-mapper function to generate LLR data on coded bits for each incoming received symbol. Additionally, or alternatively, the UE may decode bits of the control channel (e.g., bits of the PDCCH). For example, the UE may process the LLR data using a decoder to identify bits that map to locations of the selected DCI candidates within the search space set.

In this way, the UE efficiently and/or effectively identifies and selects the subset of the set of DCI candidates. By identifying and selecting the subset of the set of DCI candidates without having to perform channel estimation (or without having to perform channel estimation on the complete set of DCI candidates), the UE reduces a utilization of resources relative to performing channel estimation on the complete set of DCI candidates.

As indicated above, FIGS. 1A-1D are provided merely as one or more examples. Other examples may differ from what is described with regard to FIGS. 1A-1D.

Figure 2:
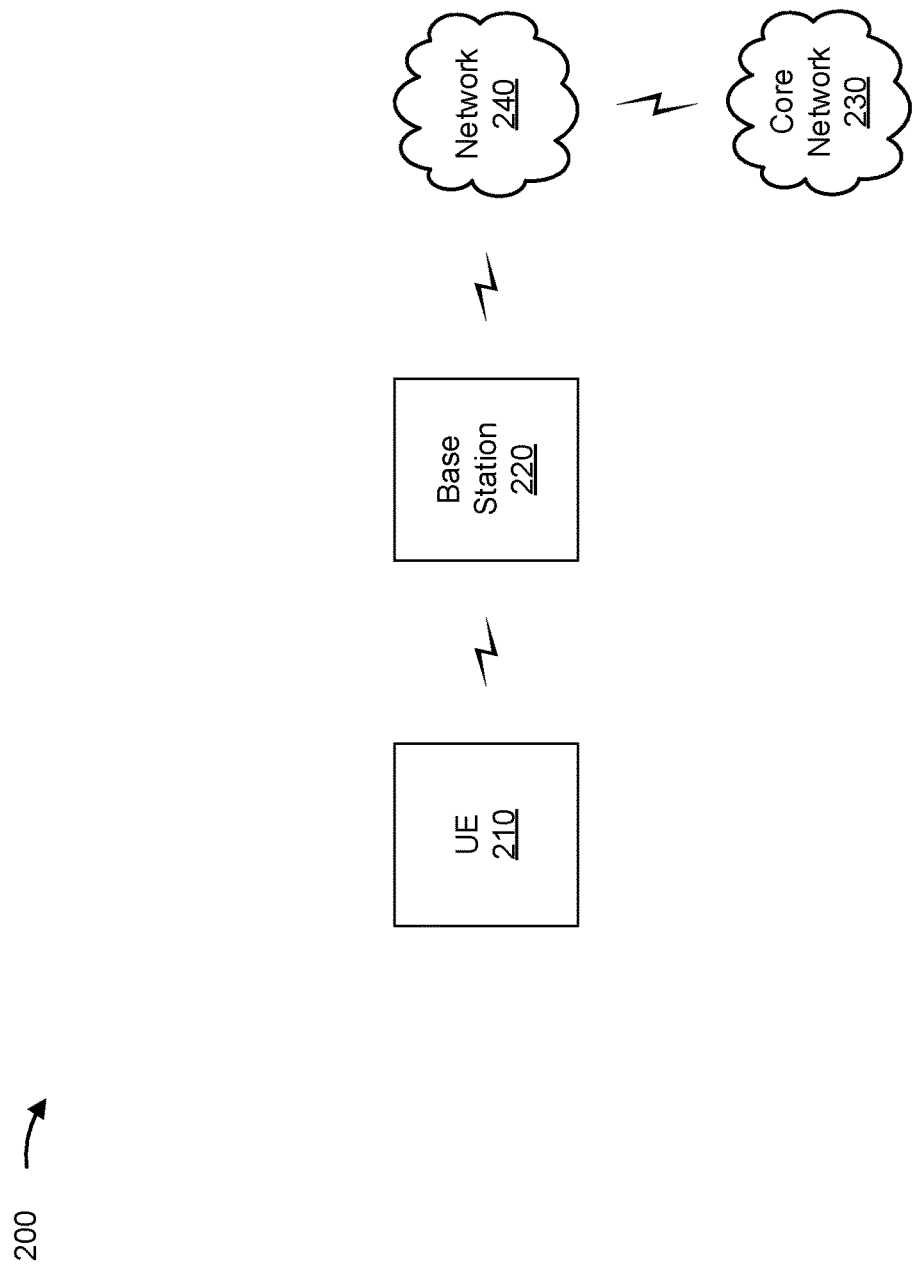
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user equipment (UE) 210, a base station 220, a core network 230, and/or a network 240. Devices of environment 200 may interconnect via wired connections, wireless connections, or a combination of wired and wireless connections.

UE 210 includes one or more devices capable of receiving, storing, processing, and/or providing information, such as information described herein. For example, UE 210 may include a wireless communication device, a radiotelephone, a personal communications system (PCS) terminal (e.g., that may combine a cellular radiotelephone with data processing and data communications capabilities), a smart phone, a laptop computer, a tablet computer, a personal gaming system, an Internet of Things (IoT) device (e.g., a smart appliance, a smart light, a connected vehicle, and/or the like), and/or a similar device. In some implementations, UE 210 may be a modernized UE (MUE).

In some implementations, UE 210 may be configured with control resource set (CORESET) configuration data. In some implementations, UE 210 may receive a reference signal (e.g., a demodulation reference signal (DMRS)) from base station 220. In some implementations, UE 210 may receive a scrambling identifier (e.g., a DMRS scrambling identifier) from base station 220. In some implementations, UE 210 may identify and select DCI candidates that are to be used to receive a control channel (e.g., a physical downlink control channel (PDCCH)). DCI candidates may be identified and selected in a manner described elsewhere herein. In some implementations, UE 210 may receive the control channel (e.g., the PDCCH) from base station 220.

Base station 220 includes one or more devices capable of communicating with UE 210 using a cellular Radio Access Technology (RAT). For example, base station 220 may include a base transceiver station, a radio base station, a node B, an evolved node B (eNB), a gNB, a base station subsystem, a cellular site, a cellular tower (e.g., a cell phone tower, a mobile phone tower, etc.), an access point, a transmit receive point (TRP), a radio access node, a macrocell base station, a microcell base station, a picocell base station, a femtocell base station, or a similar type of device. Base station 220 may transfer traffic between UE 210 (e.g., using a cellular RAT), other base stations 220 (e.g., using a wireless interface or a backhaul interface, such as a wired backhaul interface), and/or network 240. Base station 220 may provide one or more cells that cover geographic areas. Some base stations 220 may be mobile base stations. Some base stations 220 may be capable of communicating using multiple RATs.

In some implementations, base station 220 may perform scheduling and/or resource management for UEs 210 covered by base station 220 (e.g., UEs 210 covered by a cell provided by base station 220). In some implementations, base stations 220 may be controlled or coordinated by a network controller, which may perform load balancing, network-level configuration, and/or the like. The network controller may communicate with base stations 220 via a wireless or wireline backhaul. In some implementations, base station 220 may include a network controller, a self-organizing network (SON) module or component, or a similar module or component. In other words, a base station 220 may perform network control, scheduling, and/or network management functions (e.g., for other base stations 220 and/or for uplink, downlink, and/or side link communications of UEs 210 covered by the base station 220). In some implementations, base station 220 may include a central unit and multiple distributed units. The central unit may coordinate access control and communication with regard to the multiple distributed units. The multiple distributed units may provide UEs 210 and/or other base stations 220 with access to network 240. In some implementations, base station 220 may perform one or more actions described herein as being performed by UE 210.

Core network 230 includes one or more wired and/or wireless networks. In some implementations, core network 230 may include a set of core network devices and/or elements. For example, if core network 230 is a fourth generation (4G) network (e.g., a long-term evolution (LTE) network), the set of core network devices may include a mobility management entity (MME), a serving gateway (SGW), a packet data network gateway (PGW), a home subscriber server (HSS), an authentication, authorization, and accounting server (AAA), and/or the like. As another example, if core network 230 is a fifth generation (5G) network, such as an NR network, the set of core network elements may include a network slice selection function (NSSF), a network exposure function (NEF), an authentication server function (AUSF), a unified data management (UDM), a policy control function (PCF), an application function (AF), a provisioning system (PS), an access and mobility management function (AMF), a network repository function (NRF), a session management function (SMF), a user plane function (UPF), a data network, and/or the like.

Network 240 includes one or more wired and/or wireless networks. For example, network 240 may include a cellular network (e.g., a 5G network, a 4G LTE network, a third generation (3G) network, a code division multiple access (CDMA) network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
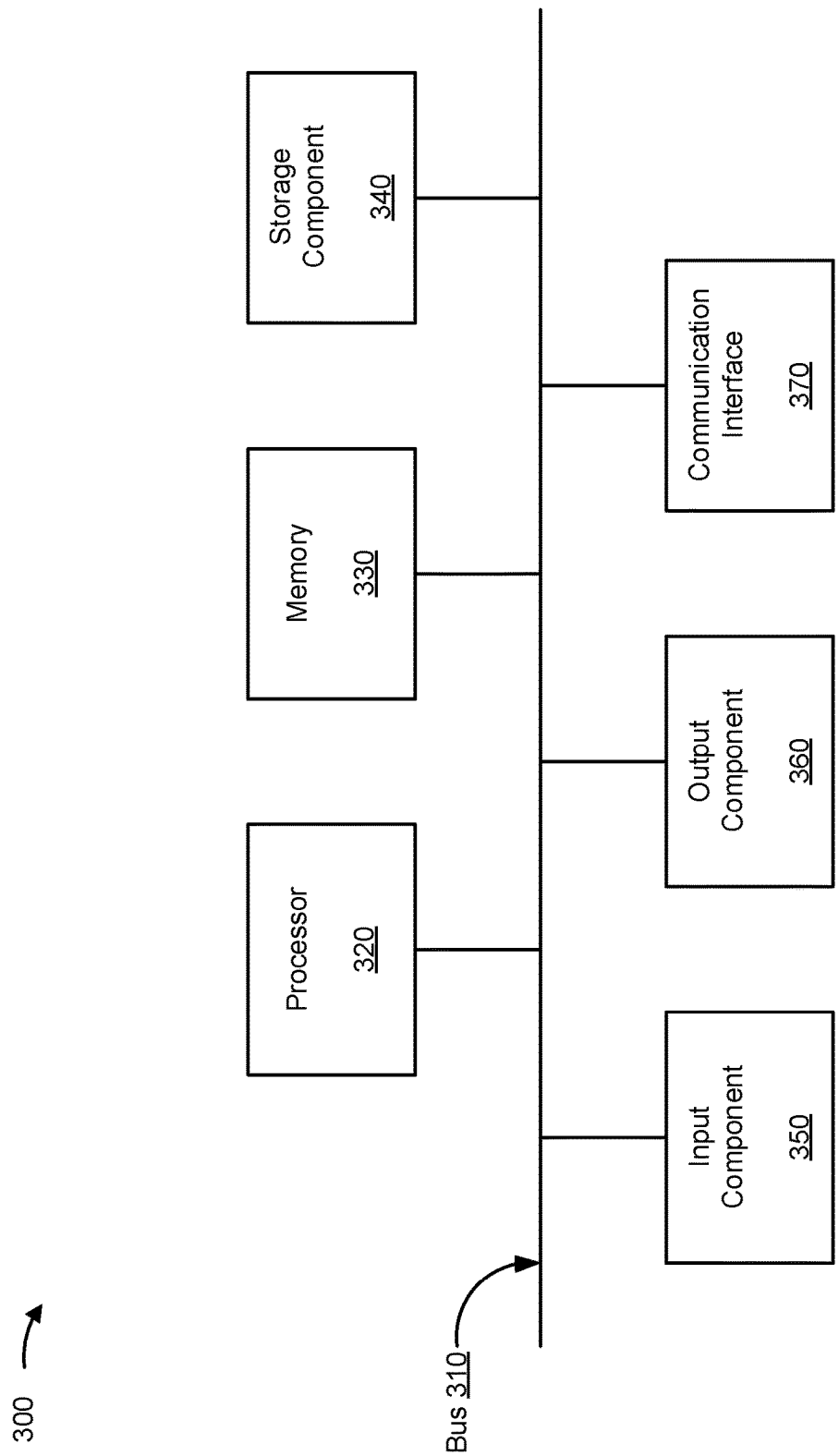
FIG. 3 is a diagram of example components of one or more devices of FIG. 2.

FIG. 3 is a diagram of example components of a device 300. Device 300 may correspond to UE 210, base station 220, and/or one or more core network devices and/or elements of core network 230. In some implementations, UE 210, base station 220, and/or one or more core network devices and/or elements of core network 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, and/or the like.

Device 300 may perform one or more processes described herein. Device 300 may perform these processes based on processor 320 executing software instructions, such as single instruction, multiple data (SIMD), or advanced vector extensions (AVX), stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
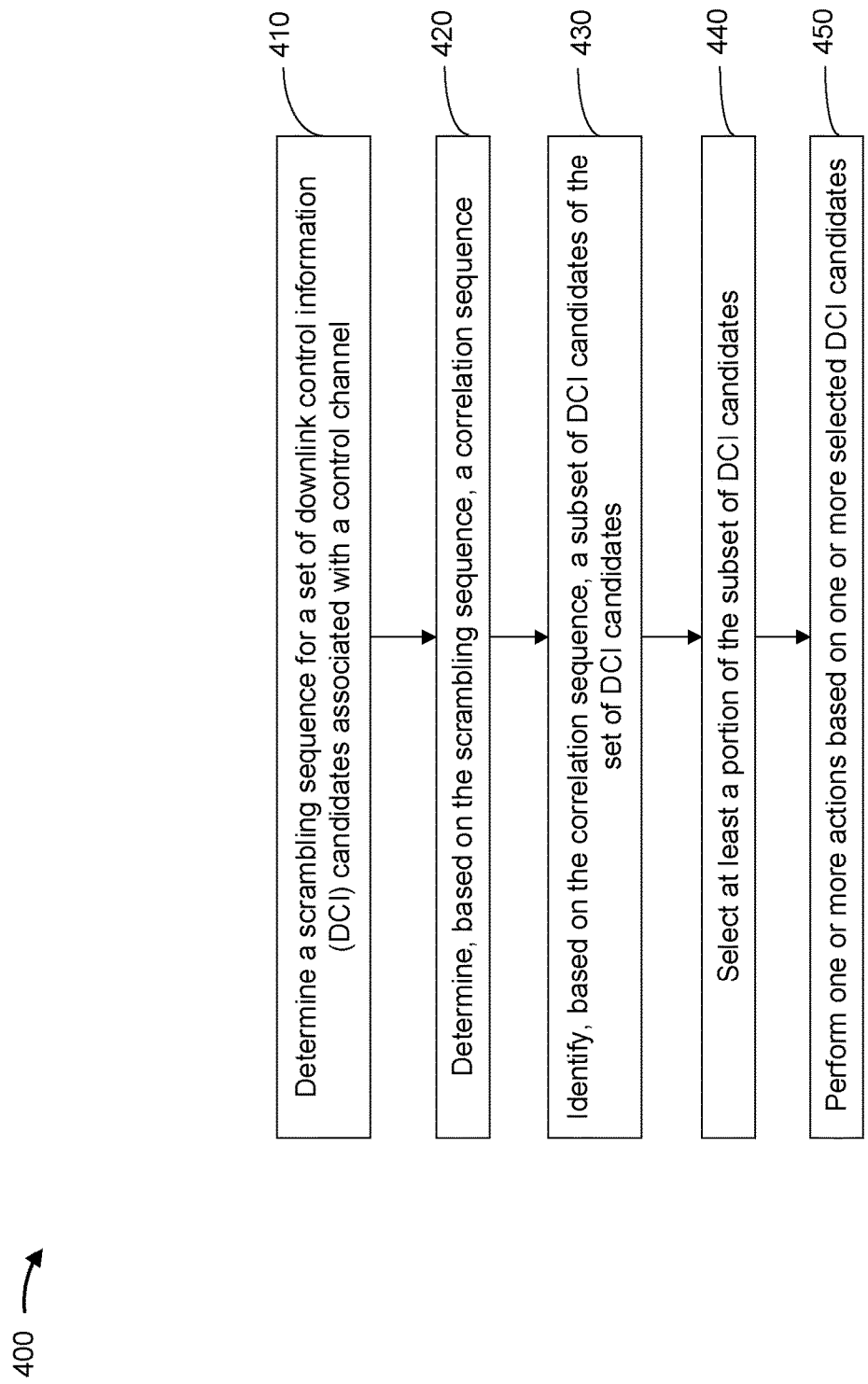
FIGS. 4-6 are flowcharts of one or more example processes for using a blind control channel detection technique to identify and select downlink control information (DCI) candidates.

FIG. 4 is a flow chart of an example process 400 for detecting downlink control information (DCI) candidates. In some implementations, one or more process blocks of FIG. 4 may be performed by a device, such as a user equipment (UE) (e.g., UE 210), a base station (e.g., base station 220), and/or the like. In some implementations, such as when the device is the UE, one or more process blocks of FIG. 4 may be performed by another device or a group of devices separate from or including the device, such as the base station, one or more devices of a core network (e.g., core network 230), and/or the like. In some implementations, such as when the device is the base station, one or more process blocks of FIG. 4 may be performed by another device or a group of devices separate from or including the device, such as the UE, the one or more devices of the core network, and/or the like.

As shown in FIG. 4, process 400 may include determining a scrambling sequence for a set of DCI candidates associated with a control channel (block 410). For example, the device (e.g., using processor 320, memory 330, storage component 340, and/or the like) may determine a scrambling sequence for a set of DCI candidates associated with a control channel, as described above. In some implementations, the scrambling sequence may include a first set of bit string values for a set of DCI candidates associated with the control channel. In some implementations, the scrambling sequence may be determined based on an identifier that is exclusive to the device.

As further shown in FIG. 4, process 400 may include determining, based on the scrambling sequence, a correlation sequence (block 420). For example, the device (e.g., using processor 320, memory 330, storage component 340, and/or the like) may determine, based on the scrambling sequence, a correlation sequence, as described above. In some implementations, the correlation sequence may include a second set of bit string values.

As further shown in FIG. 4, process 400 may include identifying, based on the correlation sequence, a subset of DCI candidates of the set of DCI candidates (block 430). For example, the device (e.g., using processor 320, memory 330, storage component 340, and/or the like) may identify, based on the correlation sequence, a subset of DCI candidates of the set of DCI candidates, as described above.

As further shown in FIG. 4, process 400 may include selecting at least a portion of the subset of DCI candidates (block 440). For example, the device (e.g., using processor 320, memory 330, storage component 340, and/or the like) may select at least a portion of the subset of DCI candidates, as described above.

As further shown in FIG. 4, process 400 may include performing one or more actions based on one or more selected DCI candidates (block 450). For example, the device (e.g., using processor 320, memory 330, storage component 340, input component 350, output component 360, communication interface 370, and/or the like) may perform one or more actions based on one or more selected DCI candidates, as described above.

Process 400 may include additional implementations, such as any single implementation or any combination of implementations described below and/or in connection with one or more other processes described elsewhere herein.

In a first implementation, the first set of bit string values included in the scrambling sequence may be a first set of integer values and the second set of bit string values included in the correlation sequence may be a second set of integer values. In some implementations, a data structure accessible to the device may map the set of DCI candidates with corresponding configured integer values. In some implementations, when identifying the subset of DCI candidates, the device may compare respective integer values, of the second set of integer values included in the correlation sequence, with the corresponding configured integer values. Additionally, the device may identify the subset of DCI candidates based on comparing the respective integer values with the corresponding configured integer values.

In a second implementation, alone or in combination with the first implementation, the second set of bit string values of the correlation sequence may be a second set of 64-bit integer values. In some implementations, when identifying the subset of DCI candidates, the device may compare 64-bit integer values, of the second set of 64-bit integer values of the correlation sequence, with corresponding configured 64-bit integer values. Additionally, the device may identify the subset of DCI candidates based on comparing the 64-bit integer values with the corresponding configured 64-bit integer values.

In a third implementation, alone or in combination with one or more of the first and second implementations, respective bit string values, of the first set of bit string values, may be pairs of integer values that include a real number and an imaginary number associated with a sign of the real number.

In a fourth implementation, alone or in combination with one or more of the first through third implementations, the device may receive an indication that the second set of bit string values of the correlation sequence of the device matches a corresponding bit string value that is part of a correlation sequence for another device. Additionally, the device may perform a channel estimation technique based on receiving the indication. Additionally, the device may identify one or more DCI candidates, of the subset of DCI candidates, based on an output of the channel estimation technique. The one or more DCI candidates may be associated with particular bit string values that do not match corresponding bit string values of the correlation sequence for the other device. Additionally, when selecting at least the portion of the subset of DCI candidates, the device may select the one or more identified DCI candidates.

In a fifth implementation, alone or in combination with one or more of the first through fourth implementations, the set of DCI candidates may be part of a plurality of search spaces. In a sixth implementation, alone or in combination with one or more of the first through fifth implementations, the control channel may be a physical downlink control channel (PDCCH). In some implementations, the identifier that is exclusive to the device may be a PDCCH scrambling identifier.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
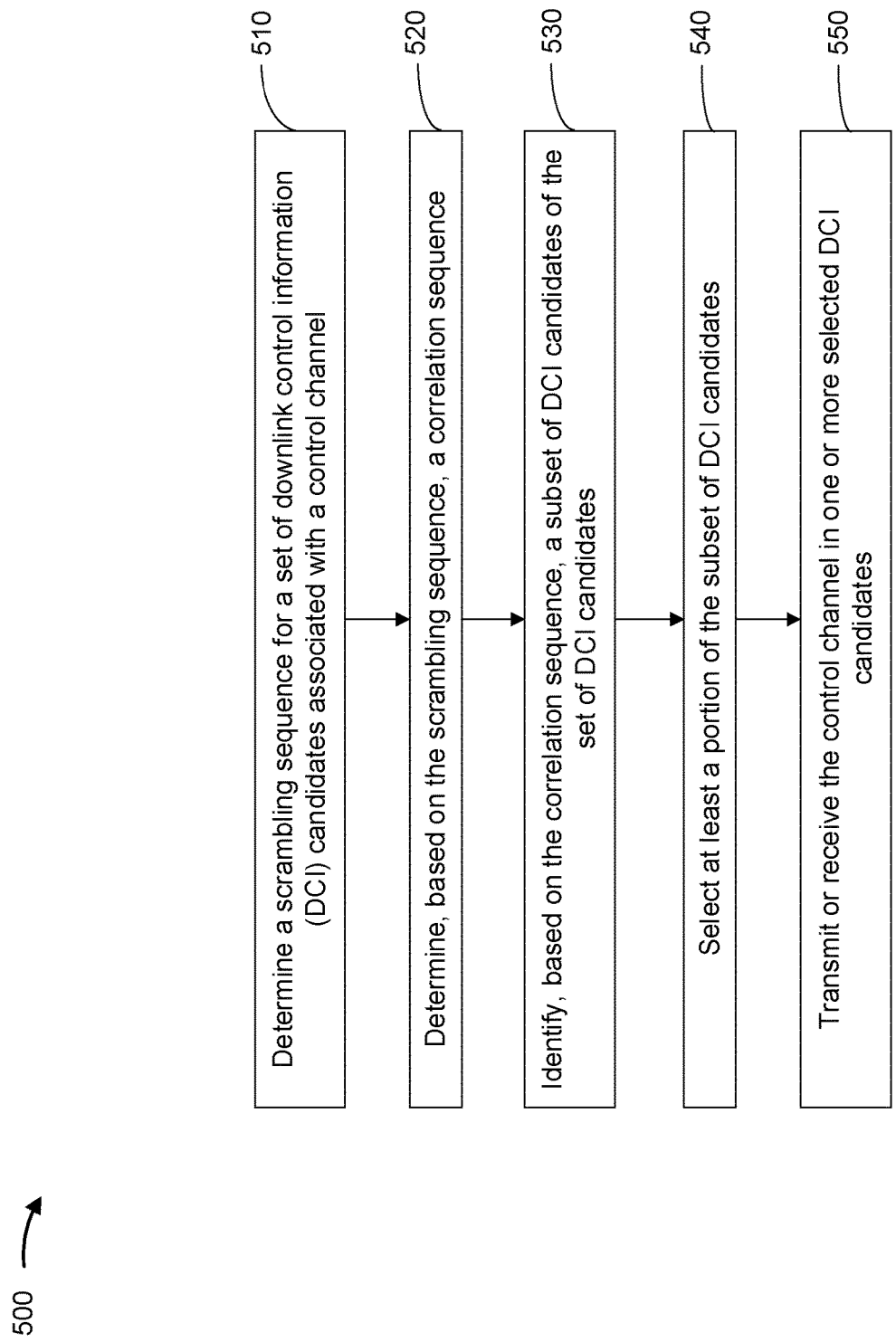

FIG. 5 is a flow chart of an example process 500 for detecting DCI candidates. In some implementations, one or more process blocks of FIG. 5 may be performed by a device, such as a UE (e.g., UE 210), a base station (e.g., base station 220), and/or the like. In some implementations, such as when the device is the UE, one or more process blocks of FIG. 5 may be performed by another device or a group of devices separate from or including the device, such as the base station, one or more devices of a core network (e.g., core network 230), and/or the like. In some implementations, such as when the device is the base station, one or more process blocks of FIG. 5 may be performed by another device or a group of devices separate from or including the device, such as the UE, the one or more devices of the core network, and/or the like.

As shown in FIG. 5, process 500 may include determining a scrambling sequence for a set of DCI candidates associated with a control channel (block 510). For example, the device (e.g., using processor 320, memory 330, storage component 340, input component 350, output component 360, communication interface 370, and/or the like) may determine a scrambling sequence for a set of DCI candidates associated with a control channel, as described above. In some implementations, the scrambling sequence may include a first set of integer values for the set of DCI candidates associated with the control channel. In some implementations, the scrambling sequence may be determined based on an identifier that is linked to the device.

As further shown in FIG. 5, process 500 may include determining, based on the scrambling sequence, a correlation sequence (block 520). For example, the device (e.g., using processor 320, memory 330, storage component 340, input component 350, output component 360, communication interface 370, and/or the like) may determine, based on the scrambling sequence, a correlation sequence, as described above. In some implementations, the correlation sequence may include a second set of integer values.

As further shown in FIG. 5, process 500 may include identifying, based on the correlation sequence, a subset of DCI candidates of the set of DCI candidates (block 530). For example, the device (e.g., using processor 320, memory 330, storage component 340, input component 350, output component 360, communication interface 370, and/or the like) may identify, based on the correlation sequence, a subset of DCI candidates of the set of DCI candidates, as described above.

As further shown in FIG. 5, process 500 may include selecting at least a portion of the subset of DCI candidates (block 540). For example, the device (e.g., using processor 320, memory 330, storage component 340, input component 350, output component 360, communication interface 370, and/or the like) may select at least a portion of the subset of DCI candidates, as described above.

As further shown in FIG. 5, process 500 may include transmitting or receiving the control channel in one or more selected DCI candidates (block 550). For example, the device (e.g., using processor 320, memory 330, storage component 340, input component 350, output component 360, communication interface 370, and/or the like) may transmit or receive the control channel in one or more selected DCI candidates, as described above.

Process 500 may include additional implementations, such as any single implementation or any combination of implementations described below and/or in connection with one or more other processes described elsewhere herein.

In a first implementation, the device may, using one or more memories of the device, store respective DCI candidates in association with corresponding configured integer values. In some implementations, when identifying the subset of DCI candidates, the device may compare respective integer values, of the second set of integer values included in the correlation sequence, with the corresponding configured integer values, and may identify the subset of DCI candidates based on comparing the respective integer values with the corresponding configured integer values.

In a second implementation, alone or in combination with the first implementation, the device, when identifying the subset of DCI candidates, may compare respective integer values, of the second set of integer values included in the correlation sequence, with corresponding configured integer values, and may identify the subset of DCI candidates based on comparing the respective integer values with the corresponding configured integer values.

In a third implementation, alone or in combination with one or more of the first and second implementations, respective integer values, of the first set of integer values included in the scrambling sequence, are pairs of integer values that include a real number and an imaginary number associated with a sign of the real number.

In a fourth implementation, alone or in combination with one or more of the first through third implementations, the device may receive an indication that a bit string value, of the second set of bit string values of the correlation sequence, matches a corresponding bit string value that is part of a correlation sequence for another device. Additionally, the device may perform a channel estimation technique based on receiving the indication. Additionally, the device may identify one or more DCI candidates, of the subset of DCI candidates, based on an output of the channel estimation technique. The one or more DCI candidates may be associated with particular bit string values that do not match corresponding bit string values of the correlation sequence for the other device.

In a fifth implementation, alone or in combination with one or more of the first through fourth implementations, the control channel may be a physical downlink control channel (PDCCH). In some implementations, the identifier that is linked to the device may be a PDCCH scrambling identifier.

In a sixth implementation, alone or in combination with one or more of the first through fifth implementations, the device may, using one or more memories of the device, store channel estimation data associated with the selected subset of DCI candidates. Additionally, the device may determine to forego performance of a channel estimation technique on the channel estimation data that is associated with the selected subset of DCI candidates.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
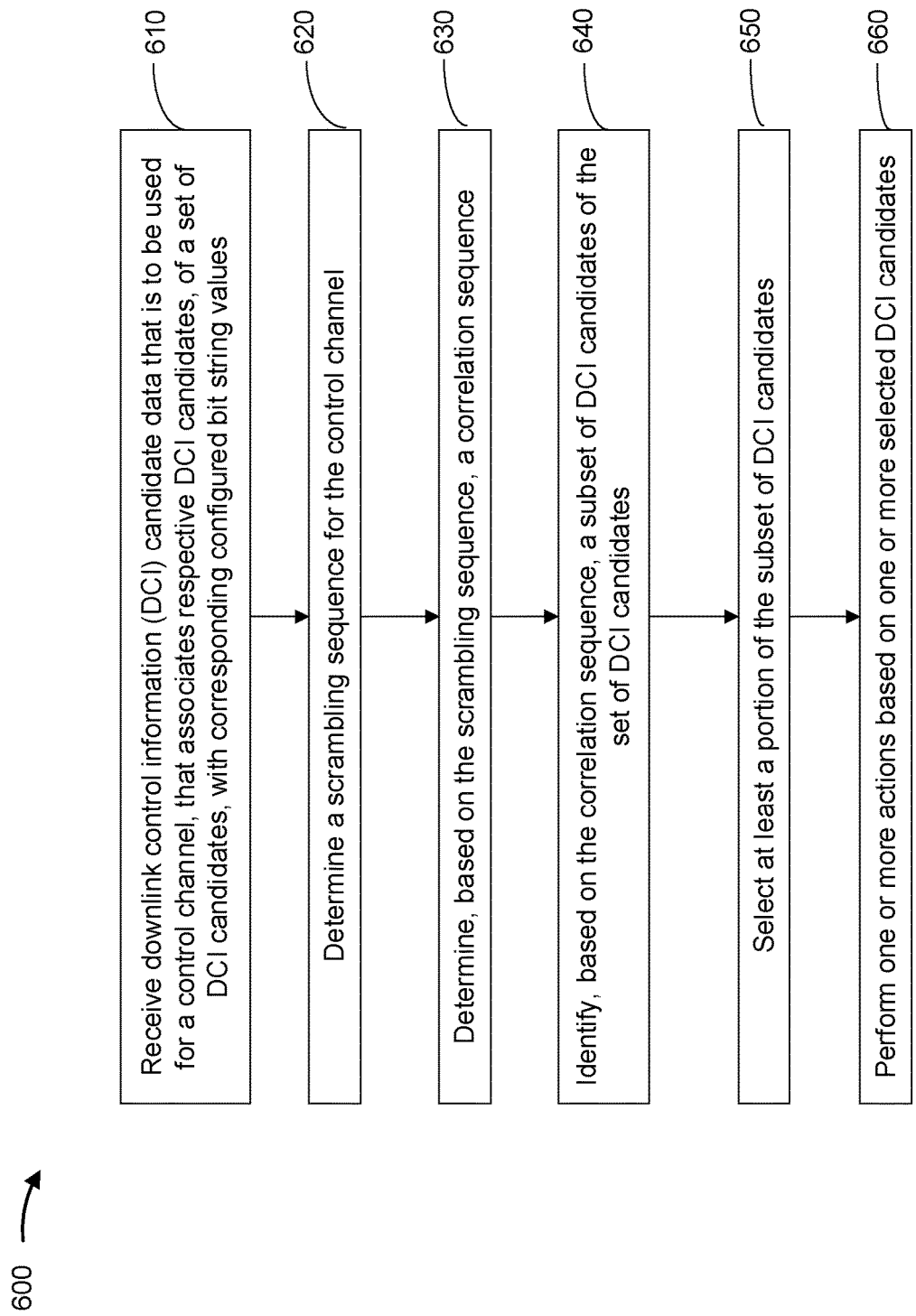

FIG. 6 is a flow chart of an example process 600 for systems and methods for detecting DCI candidates. In some implementations, one or more process blocks of FIG. 6 may be performed by a device, such as a UE (e.g., UE 210), a base station (e.g., base station 220), and/or the like. In some implementations, such as when the device is the UE, one or more process blocks of FIG. 6 may be performed by another device or a group of devices separate from or including the device, such as the base station, one or more devices of a core network (e.g., core network 230), and/or the like. In some implementations, such as when the device is the base station, one or more process blocks of FIG. 6 may be performed by another device or a group of devices separate from or including the device, such as the UE, the one or more devices of the core network, and/or the like.

As shown in FIG. 6, process 600 may include receiving DCI candidate configuration data that is to be used for a control channel, that associates respective DCI candidates, of a set of DCI candidates, with corresponding configured bit string values (block 610). For example, the device (e.g., using processor 320, memory 330, storage component 340, input component 350, output component 360, communication interface 370, and/or the like) may receive DCI candidate data that is to be used for a control channel, that associates respective DCI candidates, of a set of DCI candidates, with corresponding configured bit string values, as described above.

As further shown in FIG. 6, process 600 may include determining a scrambling sequence for the control channel (block 620). For example, the device (e.g., using processor 320, memory 330, storage component 340, input component 350, output component 360, communication interface 370, and/or the like) may determine a scrambling sequence for the control channel, as described above. In some implementations, the scrambling sequence may include a first set of bit string values for the set of DCI candidates associated with the control channel. In some implementations, the scrambling sequence may be determined based on an identifier that is exclusive to the device.

As further shown in FIG. 6, process 600 may include determining, based on the scrambling sequence, a correlation sequence (block 630). For example, the device (e.g., using processor 320, memory 330, storage component 340, input component 350, output component 360, communication interface 370, and/or the like) may determine, based on the scrambling sequence, a correlation sequence, as described above. In some implementations, the correlation sequence may include a second set of bit string values.

As further shown in FIG. 6, process 600 may include identifying, based on the correlation sequence, a subset of DCI candidates of the set of DCI candidates (block 640). For example, the device (e.g., using processor 320, memory 330, storage component 340, input component 350, output component 360, communication interface 370, and/or the like) may identify, based on the correlation sequence, a subset of DCI candidates of the set of DCI candidates, as described above.

As further shown in FIG. 6, process 600 may include selecting at least a portion of the subset of DCI candidates (block 650). For example, the device (e.g., using processor 320, memory 330, storage component 340, input component 350, output component 360, communication interface 370, and/or the like) may select at least a portion of the subset of DCI candidates, as described above.

As further shown in FIG. 6, process 600 may include performing one or more actions based on one or more selected DCI candidates (block 660). For example, the device (e.g., using processor 320, memory 330, storage component 340, input component 350, output component 360, communication interface 370, and/or the like) may perform one or more actions based on one or more selected DCI candidates, as described above. In some implementations, the one or more actions may include at least one of: a first action to transmit the control channel, a second action to cause the control channel to be received, or a third action to decode the control channel.

Process 600 may include additional implementations, such as any single implementation or any combination of implementations described below and/or in connection with one or more other processes described elsewhere herein.

In a first implementation, the corresponding configured bit string values may be corresponding configured 64-bit integer values, the first set of bit string values may include 64-bit integer values, and the second set of bit string values may include other 64-bit integer values. In some implementations, when identifying the subset of DCI candidates, the device may compare the other 64-bit integer values with the corresponding configured 64-bit integer values and may identify the subset of DCI candidates based on comparing the other 64-bit integer values with the corresponding configured 64-bit integer values.

In a second implementation, alone or in combination with the first implementation, respective bit string values, of the first set of integer values, may be pairs of integer values that include a real number and an imaginary number associated with a sign of the real number.

In a third implementation, alone or in combination with one or more of the first and second implementations, the device may receive an indication that a bit string value, of the second set of bit string values of the correlation sequence, matches a corresponding bit string value that is part of a correlation sequence for another device. Additionally, the device may perform a channel estimation technique based on receiving the indication. Additionally, the device may identify one or more DCI candidates, of the subset of DCI candidates, based on an output of the channel estimation technique. The one or more DCI candidates may be associated with particular bit string values that do not match corresponding bit string values of the correlation sequence for the other device. Additionally, when selecting at least the portion of the subset of DCI candidates, the device may select the one or more DCI candidates.

In a fourth implementation, alone or in combination with one or more of the first through third implementations, the set of DCI candidates may be part of a plurality of search spaces.

In a fifth implementation, alone or in combination with one or more of the first through fourth implementations, the device may store channel estimation data associated with the one or more selected DCI candidates via a data structure. Additionally, the device may determine to forego execution of a channel estimation technique on the channel estimation data that is associated with the one or more selected DCI candidates.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   determining, by a device, a scrambling sequence for a control channel,
      wherein the scrambling sequence includes a first set of bit string values for a set of downlink control information (DCI) candidates associated with the control channel, and
      wherein the scrambling sequence is determined based on an identifier that is exclusive to the device or a group of devices;
   determining, by the device and based on the scrambling sequence, a correlation sequence that includes a second set of bit string values;

identifying, by the device and based on the correlation sequence, a subset of DCI candidates of the set of DCI candidates;

selecting, by the device, at least a portion of the subset of DCI candidates; and performing, by the device, one or more actions based on one or more selected DCI candidates.

2. The method of claim 1, wherein the first set of bit string values included in the scrambling sequence are a first set of integer values and the second set of bit string values included in the correlation sequence are a second set of integer values;

wherein a data structure accessible to the device maps the set of DCI candidates with corresponding configured integer values; and wherein identifying the subset of DCI candidates comprises:

comparing respective integer values, of the second set of integer values included in the correlation sequence, with the corresponding configured integer values, and identifying the subset of DCI candidates based on comparing the respective integer values with the corresponding configured integer values.

3. The method of claim 1, wherein the second set of bit string values of the correlation sequence are a second set of 64-bit integer values; and wherein identifying the subset of DCI candidates comprises:

comparing 64-bit integer values, of the second set of 64-bit integer values of the correlation sequence, with corresponding configured 64-bit integer values, and identifying the subset of DCI candidates based on comparing the 64-bit integer values with the corresponding configured 64-bit integer values.

4. The method of claim 1, wherein respective bit string values, of the first set of bit string values, are pairs of integer values that include a real number and an imaginary number associated with a sign of the real number.

5. The method of claim 1, further comprising:

receiving an indication that the second set of bit string values of the correlation sequence matches a corresponding bit string value that is part of a correlation sequence for another device;

performing a channel estimation technique based on receiving the indication;

identifying one or more DCI candidates, of the subset of DCI candidates, based on an output of the channel estimation technique, wherein the one or more DCI candidates are associated with particular bit string values that do not match corresponding bit string values of the correlation sequence for the other device; and wherein selecting at least the portion of the subset of DCI candidates comprises:

selecting the one or more DCI candidates.

6. The method of claim 1, wherein the set of DCI candidates are part of a plurality of search spaces.

7. The method of claim 1, wherein the control channel is a physical downlink control channel (PDCCH); and wherein the identifier that is exclusive to the device is a PDCCH scrambling identifier.

8. A device, comprising:

one or more memories; and one or more processors, communicatively coupled to the one or more memories, configured to:

determine a scrambling sequence for a control channel, wherein the scrambling sequence includes a first set of integer values for a set of downlink control information (DCI) candidates associated with the control channel, and wherein the scrambling sequence is determined based on an identifier that is linked to the device;

determine, based on the scrambling sequence, a correlation sequence that includes a second set of integer values;

identify, based on the correlation sequence, a subset of DCI candidates of the set of DCI candidates;

select at least a portion of the subset of DCI candidates; and transmit or receive the control channel in one or more selected DCI candidates.

9. The device of claim 8, wherein the one or more processors are further configured to:

store, using the one or more memories, respective DCI candidates in association with corresponding configured integer values; and wherein the one or more processors, when identifying the subset of DCI candidates, are configured to:

compare respective integer values, of the second set of integer values included in the correlation sequence, with the corresponding configured integer values, and identify the subset of DCI candidates based on comparing the respective integer values with the corresponding configured integer values.

10. The device of claim 8, wherein the one or more processors, when identifying the subset of DCI candidates, are configured to:

compare respective integer values, of the second set of integer values included in the correlation sequence, with corresponding configured integer values, and identify the subset of DCI candidates based on comparing the respective integer values with the corresponding configured integer values.

11. The device of claim 8, wherein respective integer values, of the first set of integer values included in the scrambling sequence, are pairs of integer values that include a real number and an imaginary number associated with a sign of the real number.

12. The device of claim 8, wherein the one or more processors are further configured to:

receive an indication that the second set of integer values of the correlation sequence matches a corresponding bit string value that is part of a correlation sequence for another device;

perform a channel estimation technique based on receiving the indication;

identify one or more DCI candidates, of the subset of DCI candidates, based on an output of the channel estimation technique, wherein the one or more DCI candidates are associated with particular bit string values that do not match corresponding bit string values of the correlation sequence for the other device; and wherein the one or more processors, when selecting at least the portion of the subset of DCI candidates, are configured to:

select the one or more DCI candidates.

13. The device of claim 8, wherein the control channel is a physical downlink control channel (PDCCH); and
wherein the identifier that is linked to the device is a PDCCH scrambling identifier.

14. The device of claim 8, wherein the one or more processors are further configured to:
store, using the one or more memories, channel estimation data associated with the subset of DCI candidates; and
determine to forego performance of a channel estimation technique on the channel estimation data that is associated with the subset of DCI candidates.

15. A non-transitory computer-readable medium storing instructions, the instructions comprising:
one or more instructions that, when executed by one or more processors of a device, cause the one or more processors to:
receive downlink control information (DCI) candidate data that is to be used for a control channel, that associates respective DCI candidates, of a set of DCI candidates, with corresponding configured bit string values;
determine a scrambling sequence for the control channel,
wherein the scrambling sequence includes a first set of bit string values for the set of DCI candidates associated with the control channel, and
wherein the scrambling sequence is determined based on an identifier that is exclusive to the device;
determine, based on the scrambling sequence, a correlation sequence that includes a second set of bit string values;
identify, by the device and based on the correlation sequence, a subset of DCI candidates of the set of DCI candidates;
select at least a portion of the subset of DCI candidates; and
perform one or more actions based on one or more selected DCI candidates,
wherein the one or more actions include at least one of:
a first action to transmit the control channel,
a second action to cause the control channel to be received, or
a third action to decode the control channel.

16. The non-transitory computer-readable medium of claim 15, wherein the corresponding configured bit string values are corresponding configured 64-bit integer values, the first set of bit string values include 64-bit integer values, and the second set of bit string values include other 64-bit integer values; and
wherein the one or more instructions, that cause the one or more processors to identify the subset of DCI candidates, cause the one or more processors to:
compare the other 64-bit integer values with the corresponding configured 64-bit integer values, and
identify the subset of DCI candidates based on comparing the other 64-bit integer values with the corresponding configured 64-bit integer values.

17. The non-transitory computer-readable medium of claim 15, wherein respective bit string values, of the first set of bit string values, are pairs of integer values that include a real number and an imaginary number associated with a sign of the real number.

18. The non-transitory computer-readable medium of claim 15, wherein the one or more instructions, when executed by the one or more processors, further cause the one or more processors to:
receive an indication that a bit string value, of the second set of bit string values of the correlation sequence, matches a corresponding bit string value that is part of a correlation sequence for another device;
perform a channel estimation technique based on receiving the indication; and
identify one or more DCI candidates, of the subset of DCI candidates, based on an output of the channel estimation technique,
wherein the one or more DCI candidates are associated with particular bit string values that do not match corresponding bit string values of the correlation sequence for the other device; and
wherein the one or more instructions, that cause the one or more processors to select at least the portion of the subset of DCI candidates, cause the one or more processors to:
select the one or more DCI candidates.

19. The non-transitory computer-readable medium of claim 15, wherein the set of DCI candidates are part of a plurality of search spaces.

20. The non-transitory computer-readable medium of claim 15, wherein the one or more instructions, when executed by the one or more processors, further cause the one or more processors to:
store channel estimation data associated with the one or more selected DCI candidates via a data structure; and
determine to forego execution of a channel estimation technique on the channel estimation data that is associated with the one or more selected DCI candidates.

* * * * *